United States Patent Office 3,269,853
Patented August 30, 1966

---

3,269,853
CURED POLYEPOXIDE RESIN COMPOSITIONS
William David English, Garden Grove, Irving S. Bengelsdorf, Costa Mesa, and George W. Willcockson, Anaheim, Calif., assignors to United States Borax & Chemical Corporation, Los Angeles, Calif., a corporation of Nevada
No Drawing. Filed Dec. 16, 1960, Ser. No. 76,160
16 Claims. (Cl. 106—243)

The present invention relates as indicated to cured polyepoxide resin compositions comprising a reactive polyepoxide and a boron ester curing agent.

It is, therefore, the principal object of this invention to provide new polyepoxide resin compositions comprising a reactive polyepoxide and a boron ester curing agent.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises a composition comprising a reactive polyepoxide having more than one epoxy group per molecule and from about 2% to about 50%, based on the weight of said reactive polyepoxide, of a boron ester curing agent, said curing agent selected from the group consisting of

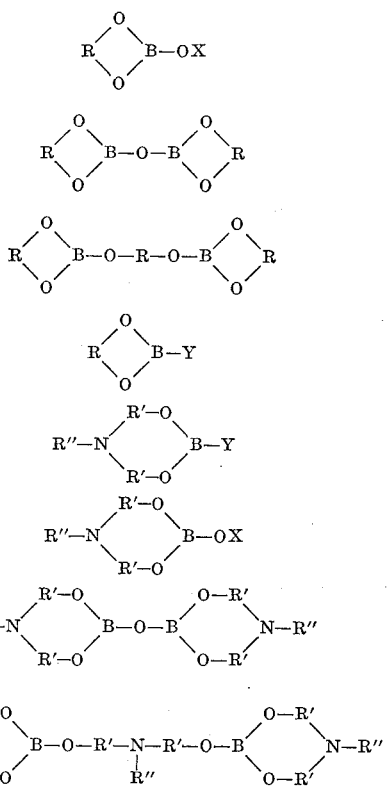

and where R is a radical selected from the group consisting of unsubstituted aliphatic hydrocarbon radicals having from 1 to 12 carbon atoms, substituted aliphatic hydrocarbon radicals of from 1 to 12 carbon atoms having aromatic hydrocarbon substituents, unsubstituted aromatic hydrocarbon radicals and substituted aromatic hydrocarbon radicals having unsubstituted aliphatic hydrocarbon substituents of from 1 to 12 carbon atoms, R' is an unsubstituted aliphatic hydrocarbon radical having from 1 to 8 carbon atoms, R'' is a radical selected from the group consisting of hydrogen, unsubstituted aliphatic hydrocarbon radicals having from 1 to 8 carbon atoms and phenyl, X is selected from the group consisting of hydrogen, the alkali metals, the alkaline earth metals, unsubstituted aliphatic hydrocarbon radicals having from 1 to 8 carbon atoms and phenyl and Y is a radical selected from the group consisting of unsubstituted aliphatic hydrocarbon radicals having from 1 to 12 carbon atoms, substituted aliphatic hydrocarbon radicals of from 1 to 12 carbon atoms having halogen substituents, unsubstituted aromatic hydrocarbon radicals, substituted aromatic hydrocarbon radicals having aliphatic hydrocarbon substituents of from 1 to 12 carbon atoms, substituted aliphatic hydrocarbon radicals of from 1 to 12 carbon atoms having aromatic hydrocarbon substituents, substituted aromatic hydrocarbon radicals having halogen substituents and heterocyclic hydrocarbon radicals.

The reactive polyepoxides applicable to the present invention are compounds or mixtures of compounds, the average molecule of which contains more than one 1,2-epoxy groups,

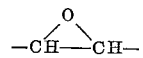

arranged in either one or more open chain or cyclic structures. Owing to the methods for preparing the reactive polyepoxides, and the fact that they are sometimes a mixture of chemical compounds having different structures, and containing some groups which are not converted to 1,2-epoxy groups, the number of epoxy groups in an average molecule of the product is not necessarily a whole number. However, in all instances this number of epoxy groups must be greater than one.

There are four major classes of reactive polyepoxides. These are:

(1) Glycidyl polyethers—derived from dihydric phenols such as bisphenol A, or derived from polyhydric phenols such as phenol-formaldehyde condensation products, or derived from polyols such as glycol and glycerol.

(2) Epoxidized unsaturated glycerides and abietic acid derivatives such as epoxidized soybean oil, linseed oil and tall oil.

(3) Epoxidized polyolefins—such as epoxidized polybutadiene and polyisoprene.

(4) Epoxidized cyclopolyolefins—such as epoxidized dicyclopentadiene, vinylcyclohexene and other Diels-Alder reaction products.

It is to be clearly understood that the term "reactive polyepoxide" as used in the present specification and appended claims is intended to include all reactive polyepoxides having more than one epoxy group per molecule, and the curing agents as defined in the foregoing broadly stated paragraph and discussed in more detail hereinafter are all applicable to all such reactive polyepoxides.

The term "cured polyepoxide resin" as used in the present invention is intended to mean a polyepoxide cured to either a "class B" or to a "class C" state. A class "B" epoxy resin is one which is stable in a semicured state; it is soluble in most organic solvents and is thermoplastic, and when cured at elevated temperatures becomes thermoset. A class "C" epoxy resin is one which is thermoset and which has been formed by either going through a class "B" state or by the addition of a curing agent, with or without the application of heat.

To produce a desirable end product, a cured polyepoxide resin, the polyepoxide and curing agent used must be compatible; that is they must be miscible one with the other, at room temperature or at an elevated temperature, prior to the cure, and they must not separate while curing so that a uniform product is obtained. The boron esters of the present invention all fulfill these requirements.

As stated previously, the present curing agents are derived from dihydric alcohols. These derivatives of the dihydric alcohols can be classified as monoborates, the glycol boronates, the alkali metal salts of the monoborates, the alkaline earth salts of the monoborates, the boric anhydrides and the biborates. The following list is illustrative of the boron esters applicable to the present invention:

n-butyl ethylene borate
1,2-propanediol monoborate
hexylene glycol monoborate
calcium hexylene glycol monoborate
1,2-butanediol monoborate
2-methyl-1,2-butanediol monoborate
ethylene glycol monoborate
1,4-butanediol monoborate
3,4-dimethyl-3,4-hexanediol monoborate
hexylene glycol nonaneboronate
octylene glycol monoborate
diethanolamine ethyleneboronate
diethanolamine benzeneboronate
catechol monoborate
3-methyl catechol monoborate
o-xylylene glycol monoborate
sodium hexylene glycol monoborate
lithium octylene glycol monoborate
potassium-o-xylylene glycol monoborate
tri-hexylene glycol biborate
tris(N-methyldiethanolamine)biborate
tri-ethylene glycol biborate
di-(butanediol-1,3) boric anhydride
di-(2,3,4-trimethylpentanediol-2,4) boric anhydride
di-(catechol) boric anhydride
di-(2-methylpentanediol-2,4) boric anhydride
di-(propanediol-1,2) boric anhydride
di-(o-xylylenediol) boric anhydride
diisopropanolamine monoborate
dibutanolamine monoborate
di-n-hexanolamine monoborate
diethanolamine monoborate
bis(diisopropanolamine) boric anhydride
bis(diethanolamine) boric anhydride
bis(dipentanolamine) boric anhydride
sodium diisopropanolamine monoborate
lithium di-n-hexanolamine monoborate
potassium diethanolamine monoborate It is to be clearly understood that the foregoing list is only a partial enumeration of the boron ester curing agents applicable to the present invention, and is not intended to limit the invention.

So that the present invention can be more clearly understood, the following examples are given for illustrative purposes:

(I)

1,3-butanediol monoborate and an epoxidized cyclopolyolefin were thoroughly mixed together in an amount equivalent to 20 parts of the monoborate per 100 parts of the reactive polyepoxide by weight. The admixture was then divided into two portions, each portion being placed in a disposable Petri dish. One portion was kept at room temperature while the other portion was placed in an oven heated at 150° C. The portion kept at room temperature became gelatinous after 48 hours while the heated portion set to a class "C" resin after 72 hours.

(II)

1,3-butanediol monoborate and a glycidyl polyether were thoroughly mixed together in an amount equivalent to 20 parts of the monoborate per 100 parts of the reactive polyepoxide by weight. The admixture was then divided into two portions, each portion being placed in a disposable Petri dish. One portion was placed in an oven heated at 100° C. while the other portion was placed in an oven heated at 150° C. After 72 hours the material kept at 100° C. was a clear liquid which cooled to a gelatinous "B" stage material. This "B" stage material would remelt and when cured at 150° C. for 36 hours set to a class "C" resin. The other portion heated at 150° C. set to a solid class "C" resin after 72 hours.

(III)

Di-hexyleneglycol boric anhydride and an epoxidized cyclopolyolefin were thoroughly mixed together in an amount equivalent to 20 parts of the boric anhydride per 100 parts of the reactive polyepoxide by weight. The admixture was then divided into two portions, each portion being placed in a disposable Petri dish. One portion was kept at room temperature while the other portion was placed in an oven heated at 150° C. The portion kept at room temperature showed no cure after 10 days while the other portion set to a class "C" resin after 72 hours.

(IV)

Di-hexyleneglycol boric anhydride and an epoxidized unsaturated glyceride were thoroughly mixed together in an amount equivalent to 20 parts of the boric anhydride to 100 parts of the reactive polyepoxide. The admixture was then divided into two portions, each portion being placed in a disposable Petri dish. One portion was kept at room temperature while the other portion was placed in an oven heated at 150° C. The portion kept at room temperature showed no cure after 10 days while the other portion set to a class "C" resin after 72 hours.

(V)

Ethylene glycol monoborate and an epoxidized cyclopolyolefin were thoroughly mixed together in an amount equivalent to 20 parts of the monoborate per 100 parts of the reactive polyepoxide by weight. The admixture was then divided into two portions, each portion being placed in a disposable Petri dish. One portion was kept at room temperature while the other portion was placed in an oven heated at 100° C. The portion kept at room temperature showed no cure after 10 days while the other portion set to a class "C" resin in 16 hours.

(VI)

Di-catechol boric anhydride and an epoxidized cyclopolyolefin were thoroughly mixed together in an amount equivalent to 22 parts of the boric anhydride per 100 parts of the reactive polyepoxide by weight. The admixture was then divided into two portions, each portion being placed in a disposable Petri dish. One portion was kept at room temperature while the other portion was placed in an oven heated at 100° C. The portion kept at room temperature showed no cure after 10 days while the other portion set to a class "C" resin in 25 hours.

(VII)

Sodium hexyleneglycol monoborate and a glycidyl polyether were thoroughly mixed together in an amount equivalent to 20 parts of the monoborate per 100 parts of the reactive polyepoxide. Upon heating the mixture to 150° C., a class "C" resin was obtained.

(VIII)

Sodium hexyleneglycol monoborate and an epoxidized cyclopolyolefin were thoroughly mixed together in an amount equivalent to 20 parts of the monoborate per 100 parts of the reactive polyepoxide by weight. The admixture was then divided into two portions, each portion being placed in a disposable Petri dish. One portion was kept at room temperature while the other portion was placed in an oven heated at 100° C. The portion kept at room temperature showed no cure after 10 days. After 21 hours at 100° C. the other portion was still liquid but on cooling a class "B" gel was formed. The gel when heated at 150° C. for 72 hours set to a class "C" resin.

(IX)

Sodium hexyleneglycol monoborate and an epoxidized polyolefin were thoroughly mixed together in an amount equivalent to 10 parts of the monoborate per 100 parts of the reactive polyepoxide by weight. The admixture was then divided into two portions, each portion being placed in a disposable Petri dish. One portion was kept at room temperature while the other portion was placed in an oven heated at 100° C. The portion kept at room temperature showed no cure after 10 days while the other portion remained a liquid after 21 hours. However, upon cooling it became a class "B" gelatinous material. Upon heating the class "B" gel for 48 hours at 150° C. a class "C" resin was obtained.

(X)

Calcium hexyleneglycol monoborate and an epoxidized cyclopolyolefin were thoroughly mixed together in an amount equivalent to 20 parts of the monoborate per 100 parts of the reactive polyepoxide by weight. The admixture was then divided into two portions, each portion being placed in a disposable Petri dish. One portion was kept at room temperature while the other portion was placed in an oven heated at 100° C. The portion kept at room temperature showed no cure after 10 days while the other portion set to a class "C" resin in 96 hours.

(XI)

Lithium hexyleneglycol monoborate and a glycidyl polyether were thoroughly mixed together in an amount equivalent to 10 parts of the monoborate per 100 parts of the reactive polyepoxide by weight. The admixture was then divided into two portions, each portion being placed in a disposable Petri dish. One portion was kept at room temperature while the other portion was placed in an oven heated at 100° C. The portion kept at room temperature showed no cure after 10 days while the other portion set to a class "C" resin in 19 hours.

(XII)

Potassium octyleneglycol monoborate and an epoxidized polyolefin were thoroughly mixed together in an amount equivalent to 30 parts of the monoborate per 100 parts of the reactive polyepoxide by weight. The admixture was then divided into two portions, each portion being placed in a disposable Petri dish. One portion was kept at room temperature while the other portion was placed in an oven heated at 150° C. The portion kept at room temperature was a solid in a semicured state after 8 days while the other portion set to a class "C" resin in 18 hours.

(XIII)

o-Xylylene glycol monoborate and an epoxidized unsaturated glyceride were thoroughly mixed together in an amount equivalent to 15 parts of the monoborate per 100 parts of the reactive polyepoxide by weight. The admixture was then divided into two portions, each portion being placed in a disposable Petri dish. One portion was kept at room temperature while the other portion was placed in an even heated at 100° C. The portion kept at room tempearture showed a cure after 3 hours while the other portion set to a class "C" resin in 30 minutes.

(XIV)

Di-o-xylyleneglycol boric anhydride and a glycidyl polyether were thoroughly mixed together in an amount equivalent to 20 parts of the boric anhydride per 100 parts of the reactive polyepoxide by weight. The admixture was then divided into two portions, each portion being placed in a disposable Petri dish. One portion was kept at room temperature while the other portion was placed in an oven heated at 100° C. The portion kept at room temperature had an increased viscosity after 10 days while the other portion set to a class "C" resin in 3 hours.

(XV)

Sodium catechol monoborate and an epoxidized cyclopolyolefin were thoroughly mixed together in an amount equivalent to 20 parts of the monoborate per 100 parts of the reactive polyepoxide by weight. The admixture was then divided into the portions, each portion being placed in a disposable Petri dish. One portion was kept at room temperature while the other portion was placed in an oven heated at 100° C. The portion kept at room temperature showed no cure after 10 days. The heated portion was a clear liquid after 21 hours; however, when cooled it set to a gelatinous class "B" resin. The gelatinous resin when heated at 150° C. for 96 hours set to a class "C" resin.

(XVI)

Hexylene glycol monoborate and an epoxidized cyclopolyolefin were thoroughly mixed together in an amount equivalent to 20 parts of the monoborate per 100 parts of the reactive polyepoxide by weight. The admixture was then divided into two portions, each portion being placed in a disposable Petri dish. One portion was kept at room temperature while the other portion was placed in an oven heated at 100° C. The portion kept at room temperature showed no cure after 10 days while the heated portion was still liquid after 48 hours. Upon cooling the heated portion solidified to a gelatinous "B" stage resin which when heated for 48 hours at 200° C. set to a class "C" resin.

(XVII)

Hexylene glycol monoborate and an epoxidized polyolefin were thoroughly mixed together in an amount equivalent to 20 parts of the monoborate per 100 parts of the reactive polyepoxide by weight. The admixture was then divided into two portions, each portion being placed in a disposable Petri dish. One portion was kept at room tempearture while the other portion was placed in an oven heated at 150° C. The portion kept at room temperature showed no cure after 10 days while the heated portion set to a class "C" resin after 24 hours.

(XVIII)

Diisopropanolamine monoborate and a glycidyl polyether were thoroughly mixed together in an amount equivalent to 20 parts of the monoborate per 100 parts of the reactive polyepoxide by weight. The admixture was then divided into two portions, each portion being placed in a disposable Petri dish. One portion was kept at room temperature while the other portion was placed in an oven heated at 150° C. The portion kept at room temperature showed no cure after 10 days while the other portion set to a class "C" resin after 36 hours.

(XIX)

Sodium diisopropanolamine monoborate and an epoxidized cyclopolyolefin were thoroughly mixed together in an amount equivalent to 20 parts of the monoborate per 100 parts of the reactive polyepoxide by weight. The admixture was then divided into two portions, each portion being placed in a disposable Petri dish. One portion was kept at room temperature while the other portion was placed in an oven heated at 100° C. The portion kept at room temperature showed no cure after 10 days while the other portion set to a class "C" resin after 96 hours.

(XX)

Bis(diisoopropanolamine)boric anhydride and an epoxidized cyclopolyolefin were thoroughly mixed together in an amount equivalent to 20 parts of the boric anhydride per 100 parts of the reactive polyepoxide by weight. The admixture was then divided into two portions, each portion being placed in a disposable Petri dish. One portion was kept at room temperature while the other portion was placed in an oven heated at 100° C. The portion kept at room temperature showed no cure after 10 days and the heated portion was still liquid after 22 hours. On cooling the heated portion set to a gelatinous "B" stage resin which when heated at 150° C. for 72 hours set to a class "C" resin.

(XXI)

Lithium dihexanolamine monoborate and an epoxidized polyolefin were thoroughly mixed together in an amount equivalent to 20 parts of the monoborate per 100 parts of the reactive polyepoxide by weight. The admixture was then divided into two portions, each portion being placed in a disposable Petri dish. One portion was kept at room temperature while the other portion was placed in an oven heated at 100° C. The portion kept at room temperature showed no cure after 10 days and the heated portion was still liquid after 24 hours. On cooling the heated portion set to a soft pliable class "B" resin which when heated to 150° C. for 36 hours set to a class "C" resin.

(XXII)

Bis(dihexanolamine)boric anhydride and a glycidyl polyether were thoroughly mixed together in an amount equivalent to 30 parts of the boric anhydride per 100 parts of the reactive polyepoxide by weight. The admixture was then divided into two portions, each portion being placed in a disposable Petri dish. One portion was kept at room temperature while the other portion was placed in an oven heated at 150° C. The portion kept at room temperature showed no cure after 10 days and the heated portion set to a class "C" resin after 18 hours.

(XXIII)

Tri-hexyleneglycol biborate and an epoxidized cyclopolyolefin were thoroughly mixed together in an amount equivalent to 20 parts of the biborate per 100 parts of the reactive polyepoxide by weight. The admixture was then divided into two portions, each portion being placed in a disposable Petri dish. One portion was kept at room temperature while the other portion was placed in an oven heated at 100° C. The portion kept at room temperature showed no cure after 10 days while the heated portion was still liquid after 48 hours. On cooling, the heated portion set to a "B" stage gelatinous resin which when heated for 48 hours at 150° C. set to a class "C" resin.

(XXIV)

Tri-hexyleneglycol biborate and an epoxidized polyolefin were thoroughly mixed together in an amount equivalent to 20 parts of the biborate per 100 parts of the reactive polyepoxide. The admixture was then divided into two portions, each portion being placed in a disposable Petri dish. One portion was kept at room temperature while the other portion was placed in an oven heated at 100° C. The portion kept at room temperature showed no cure after 10 days and the heated portion was liquid after 48 hours. On cooling, the heated portion set to a solid class "B" resin which on further heating at 150° C. for 24 hours set to a solid flexible class "C" resin.

(XXV)

Diethanolamine benzeneboronate and a glycidyl polyether were thoroughly mixed together in an amount equivalent to 20 parts of the boronate per 100 parts of the reactive polyepoxide. Upon heating to 150° C., a class "C" resin was obtained.

(XXVI)

Tris(methyldiethanolamine) biborate and an epoxidized polyolefin were thoroughly mixed together in an amount equivalent to 20 parts of the biborate per 100 parts of the reactive polyepoxide by weight. The admixture was then divided into two portions, each portion being placed in a disposable Petri dish. One portion was kept at room temperature, while the other portion was placed in an oven heated at 150° C. The portion kept at room temperature showed no cure after 10 days while the heated portion set to a class "C" resin after 12 hours.

From the foregoing examples it will be seen that the present curing agents when admixed with any type of a reactive polyepoxide will result in cured polyepoxide resin compositions. We have found that from about 2% to about 50%, based on the weight of the reactive polyepoxide, of a boron ester derived from a dihydric alcohol will induce curing and result in superior cured epoxy resin compositions.

It is sometimes desirable to add other materials to the resin composition in order to impart certain desired characteristics. It will be found that such additives do not interfere with the action of the present curing agents. Reinforcing materials such as glass, mineral and metal fibers add strength and decrease shrinkage when the composition is cured, inert granular materials such as mica, asbestos and iron oxide lower the overall cost of the finished product, thixotropic agents such as bentonite and specially prepared silicas thicken liquid epoxy compositions so that they can be applied to vertical surfaces and cured in place, and coloring agents such as titanium dioxide, cadmium yellows and organic dyestuffs overcome the amber color usually associated with a cured epoxy resin composition. These and other similar materials, known to the art, can be used in combination with the present curing agents to produce epoxy resin compositions.

The rate of cure, the curing temperature and the primary properties of the cured polyepoxide resin compositions are determined by the specific reactive polyepoxide or combination of reactive polyepoxides used, the particular curing agent used and the amount of such curing agent. Polyepoxide resins cured with the present curing agents are highly resistant to chemical attack, show a low moisture permeability and have excellent adhesive qualities. Many other properties such as hardness, high yield and tensile strength, electrical insulating, heat resistance, shear resistance, flexibility and wear resistance can be endowed the cured polyepoxide resin composition by changing any one or any combination of the above variables.

Due to the many superior properties of the cured polyepoxide resin compositions of the present invention they will be found to have utility as protective coatings and sealing compounds because of their superior adhesive qualities, chemical inertness, high strength and low moisture permeability. They can be used in tools and dies and as structural components in the equipment and construction fields. They can be used as adhesives for bonding together metal, wood or other plastics. They have excellent insulation properties. The admixtures of the reactive polyepoxides and boron esters which have long pot lives and are liquid at room temperature will find outstanding use in the potting and encapsulation of electrical components.

Other modes of applying the principle of the invention may be employed, change being made as regards the details described, provided the features stated in any of the following claims or the equivalent of such be employed.

We, therefore, particularly point out and distinctly claim as our invention:

1. A composition comprising a reactive polyepoxide having more than one epoxy group per molecule and from about 2% to about 50%, based on the weight of said reactive polyepoxide, of a boron ester curing agent as the sole curing agent, said boron ester curing agent consisting of a compound of the formula selected from the group consisting of

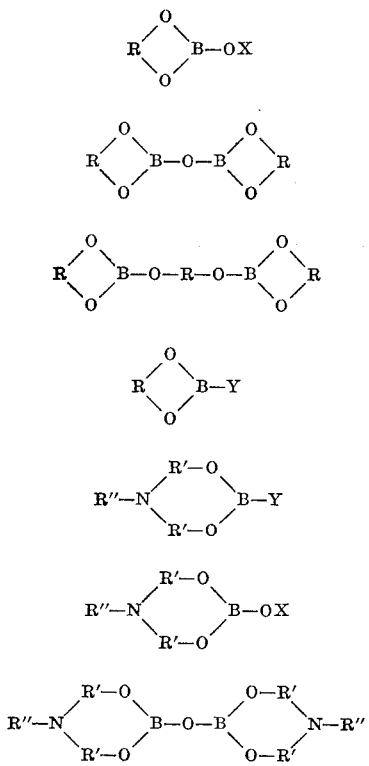

and

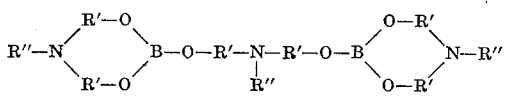

where R is a radical selected from the group consisting of unsubstituted aliphatic hydrocarbon radicals having from 1 to 12 carbon atoms, substituted aliphatic hydrocarbon radicals of from 1 to 12 carbon atoms having aromatic hydrocarbon substituents, unsubstituted aromatic hydrocarbon radicals and substituted aromatic hydrocarbon radicals having unsubstituted aliphatic hydrocarbon substituents of from 1 to 12 carbon atoms, R' is an unsubstituted aliphatic hydrocarbon radical having from 1 to 8 carbon atoms, R" is a radical selected from the group consisting of hydrogen, unsubstituted aliphatic hydrocarbon radicals having from 1 to 8 carbon atoms and phenyl, X is selected from the group consisting of hydrogen, the alkali metals, the alkaline earth metals, unsubstituted aliphatic hydrocarbon radicals having from 1 to 8 carbon atoms and phenyl and Y is a radical selected from the group consisting of unsubstituted aliphatic hydrocarbon radicals having from 1 to 12 carbon atoms, substituted aliphatic hydrocarbon radicals of from 1 to 12 carbon atoms having halogen substituents, unsubstituted aromatic hydrocarbon radicals, substituted aromatic hydrocarbon radicals having aliphatic hydrocarbon substituents of from 1 to 12 carbon atoms, substituted aliphatic hydrocarbon radicals of from 1 to 12 carbon atoms having aromatic hydrocarbon substituents, substituted aromatic hydrocarbon radicals having halogen substituents and heterocyclic hydrocarbon radicals.

2. A composition comprising a glycidyl polyether and from about 2% to about 50%, based on the weight of said glycidyl polyether of a curing agent as the sole curing agent, said curing agent consisting of sodium hexylene glycol monoborate.

3. A composition comprising an epoxidized cyclopolyolefin and from about 2% to about 50%, based on the weight of said epoxidized cyclopolyolefin of a curing agent as the sole curing agent, said curing agent consisting of sodium hexylene glycol monoborate.

4. A composition comprising a glycidyl polyether and from about 2% to about 50%, based on the weight of said glycidyl polyether of a curing agent as the sole curing agent, said curing agent consisting of lithium hexylene glycol monoborate.

5. A composition comprising an epoxidized cyclopolyolefin and from about 2% to about 50%, based on the weight of said epoxidized cyclopolyolefin of a curing agent as the sole curing agent, said curing agent consisting of calcium hexylene glycol monoborate.

6. A composition comprising an epoxidized cyclopolyolefin and from about 2% to about 50%, based on the weight of said epoxidized cyclopolyolefin of a curing agent as the sole curing agent, said curing agent consisting of sodium catechol monoborate.

7. A composition comprising an epoxidized unsaturated glyceride and from about 2% to about 50%, based on the weight of said epoxidized unsaturated glyceride of a curing agent as the sole curing agent, said curing agent consisting of di-hexyleneglycol boric anhydride.

8. A composition comprising an epoxidized cyclopolyolefin and from about 2% to about 50%, based on the weight of said epoxidized cyclopolyolefin of a curing agent as the sole curing agent, said curing agent consisting of bis(diisopropanolamine)boric anhydride.

9. A composition comprising an epoxidized polyolefin and from about 2% to about 50%, based on the weight of said epoxidized polyolefin of a curing agent as the sole curing agent, said curing agent consisting of hexylene glycol monoborate.

10. A composition comprising a glycidyl polyether and from about 2% to about 50%, based on the weight of said glycidyl polyether of a curing agent as the sole curing agent, said curing agent consisting of diisopropanolamine monoborate.

11. A composition comprising an epoxidized cyclopolyolefin and from about 2% to about 50%, based on the weight of said epoxidized cyclopolyolefin of a curing agent as the sole curing agent, said curing agent consisting of sodium diisopropanolamine monoborate.

12. A composition comprising an epoxidized unsaturated glyceride and from about 2% to about 50%, based on the weight of said epoxidized unsaturated glyceride of a curing agent as the sole curing agent, said curing agent consisting of xylylene glycol monoborate.

13. A composition comprising an epoxidized cyclopolyolefin and from about 2% to about 50%, based on the weight of said epoxidized cyclopolyolefin of a curing agent as the sole curing agent, said curing agent consisting of di-catechol boric anhydride.

14. A composition comprising an epoxidized cyclopolyolefin and from about 2% to about 50%, based on the weight of said expoxidized cyclopolyolefin of a curing agent as the sole curing agent, said curing agent consisting of tri-hexyleneglycol biborate.

15. A composition comprising an epoxidized polyolefin and from about 2% to about 50%, based on the weight of said epoxidized polyolefin of a curing agent as the sole curing agent, said curing agent consisting of tri-hexyleneglycol biborate.

16. A composition comprising an epoxidized polyolefin and from about 2% to about 50%, based on the weight of said epoxidized polyolefin of a curing agent as the sole curing agent, said curing agent consisting of tris(methyl-diethanolamine)biborate.

References Cited by the Examiner

UNITED STATES PATENTS

| | | | |
|---|---|---|---|
| 2,871,454 | 1/1959 | Langer | 260—47 |
| 2,941,981 | 6/1960 | Elbling et al. | 260—47 |

OTHER REFERENCES

Chem. and Eng. News, vol. 36, No. 29, July 21, 1958, pages 112 and 113.

WILLIAM H. SHORT, *Primary Examiner.*

H. N. BURSTEIN, JOSEPH L. SCHOEFER, *Examiners.*

A. LIEBERMAN, T. D. KERWIN, L. P. QUAST,
*Assistant Examiners.*